April 30, 1940.   L. W. MULFORD   2,199,244
ROOF LIGHT AND GRILLE THEREFOR
Filed Jan. 28, 1938
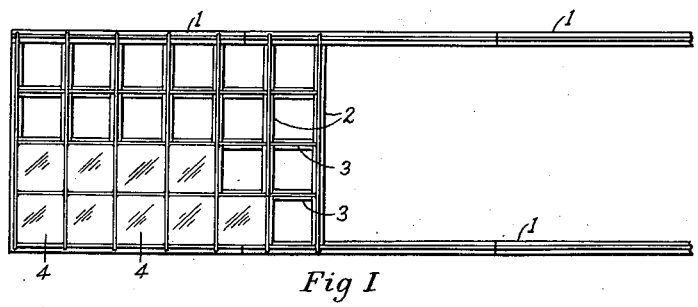
Fig I
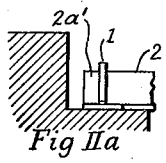
Fig IIa
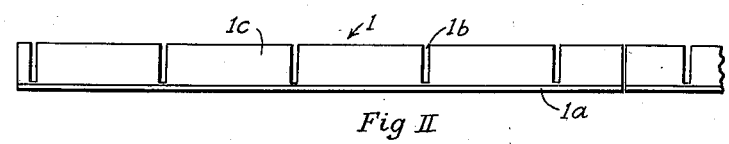
Fig II
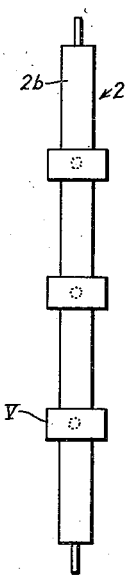
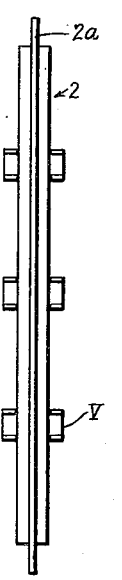
Fig. IIIa   Fig. III   Fig III b
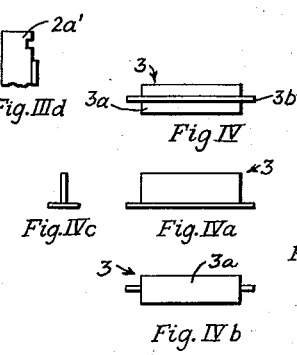
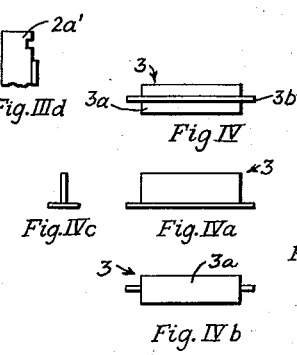
Fig. VII
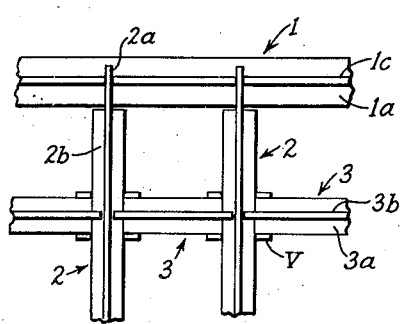
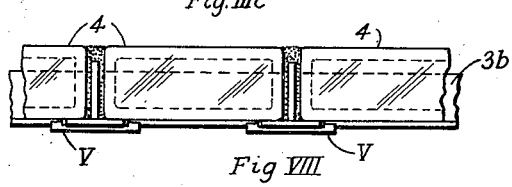
Fig VIII
INVENTOR.
Logan Willard Mulford
BY
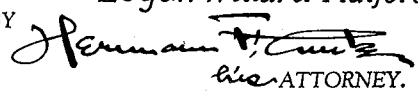
ATTORNEY.

Patented Apr. 30, 1940

2,199,244

UNITED STATES PATENT OFFICE 2,199,244

ROOF LIGHT AND GRILLE THEREFOR

Logan Willard Mulford, Kew Gardens, N. Y.

Application January 28, 1938, Serial No. 187,369

2 Claims. (Cl. 108—16)

My invention relates to glass roofs, roof lights, floor lights and the like. They involve in certain respects such structures insulated to protect against heat or cold penetration, while assuring a maximum light pervious area, and in other respects involve most advantageous forms of structural support for light pervious elements and to resist the load involved in such structures.

I provide various forms of structural support, which herein I refer to, in general, as a grille, and one of the important features involved in my invention is what I term a knockdown grille, that is one in which all or most of the structural supporting members and load-carrying members may be individually made complete, and thereafter assembled for the purpose of my complete grille by simply placing them or setting them in interconnecting position, being so constructed and arranged whereby they hold firmly together to provide the predetermined arrangement and size of apertures to receive the light pervious elements, and to be thereupon rigidly interconnected as a complete roof light with all the required rigidity and permanency for the purposes of such a structure.

I have heretofore, and in pending patent applications, shown and described structures in which insulated glass blocks are supported in a manner and in combination with load-carrying members extending across roof openings, in which the load-carrying members constitute a grille, or the light pervious blocks may be supported on reinforced concrete load-carrying elements, with various arrangements of shields or positioning elements, so that the individual blocks will be readily positioned, and the sealing of the interstices between adjacent blocks complete a roof light with assured waterproofness and watershedding, with protection for the parts, as well as means to facilitate replacement and repair of blocks. In forms in which I previously used a grille I provided, for example, a built-up grille, as distinguished from features of construction herein referred to.

The particular object of this invention is to economize in many ways in providing for and in the installation of the finished roof light or the like. A further object is to form the structure of elements that can be made of standard sizes and be kept in stock for a more expedient supply, and to expedite the work of production and installation. Furthermore, my invention provides for great economy in shipping, handling and in the transportation of the structural parts necessary in order to finish the installation.

I form the various individual members before assembly, to provide the load-supporting grille and the insulating block supporting means, with each of the members shop fabricated, but so formed that they may be individually packaged, crated and shipped, compactly, and so constructed that their assembly on the job can be made with certainty of their proper interconnections and with the provision for load-carrying and the hollow glass block supporting, so that with the application of the sealing and binding material between the adjacent insulating glass blocks, the entire structure becomes a unit and structurally integral, with all the carrying strength for its own load and any superload, such as the snow load or the load due to walking over the roof lights or floor lights.

While many variations may be made in the embodiment of my inventions, I have shown in the accompanying drawing one form, for purposes of illustration, in which:

Fig. I is a plan view of a roof light adapted to be placed on a roof opening.

Fig. II is a side elevation, on a larger scale, of a border member adapted to rest on a roof at the edge of the opening to be spanned by the roof light structure; Fig. II$^a$ is an end view of Fig. II, with the adjacent roof portion shown fragmentary in section.

Fig. III is a plan view on the same scale as Fig. II, of the carrying member, that is, one of the series of members extending across the roof opening to carry the load, as well as perform the other required function; Fig. III$^a$ is a bottom view; Fig. III$^b$ a side elevation, and Fig. III$^c$ is an end view of Fig. III, and Fig. III$^d$ shows a modified form of one part.

Fig. IV is a plan view of one of the series of short intermediate members or elements adapted to rest on the carrying members and support the light pervious blocks in conjunction with the support given by the carrying members; Fig. IV$^a$ is a side elevation, Fig. IV$^b$ a bottom view, and Fig. IV$^c$ an end view of Fig. IV.

Fig. V shows in plan and Fig. V$^a$ the end view of the supporting and positioning clip or means to be attached to the carrying member, as shown in Fig. III.

Fig. VI is a plan and elevation from two sides of a modified form of carrying and positioning means or clip.

Fig. VII is a plan, of a fragmentary portion of the assembled border, carrying members and intermediate members.

Fig. VIII is a sectional view, fragmentary, on larger scale, of the carrying members and intermediate members assembled with the hollow glass block in combination, secured by binding and sealing material as in a finished roof light.

While my invention may be variously embodied and modified, I will now describe one particular form of my construction.

I use members adapted to be placed along the side of a roof opening, which may be T section, with the web notched at predetermined intervals, corresponding to the spacing to suit the size of glass block to be combined for the finished structure. These members are kept in standard shapes and may be any size or length, adapted to be placed along the side of a roof opening, end-to-end, so that a stock of border members can be used for any length of roof opening.

I then have load-carrying cross members in which the base is cut away at each end permitting the web to overhang and rest on the side members of the roof opening. These load-carrying members are of standard lengths to suit the width of a roof light, such as any required number of glass block widths. These load-carrying cross members provide sufficient strength with a depth of web less than the thickness of the hollow glass block, so that a true grille is formed, although the members are loosely placed in position, but with ample support for all the load requirements. On the bottom of these cross members, I provide members extending laterally beyond the base with a suitable configuration, and I attach these positioning members at stated intervals corresponding to the required spacing for the size of the insulating glass block used. These positioning members may be made of various forms, but preferably fashioned so that when placed in position on the cross load-carrying members, they will be certain to take a position at right angles to the axis of the load-carrying members, projecting a short distance on either side.

The third elements in the construction are short supporting members between adjacent load-carrying members, but forming individual load-carrying members with a base and up-rising web, together being a T section, which I may make by welding a base to an upright bar, but which may be made in any desired manner, quantity, in T shape, or cast or rolled stock, having a particular formation to suit my particular purpose. The ends of these intermediate members between the main load-carrying members have their web extending at each end beyond the base, and thereby adapted to engage the adjacent load-carrying member, while the base of the intermediate member at each end rests in the projecting clips or positioning means attached to the main load-carrying member.

As shown in Fig. I, border members 1—1 rest on the edge of a roof opening, and carrying members 2—2 extend across the roof opening, while intermediate members 3—3 extend between the carrying members, and, when assembled, glass blocks 4—4 are positioned in the apertures formed by the carrying and intermediate members. Along the side of the roof opening a series of glass blocks are supported partly on the border members 1. After the assembly of the glass blocks, binding and sealing material is poured or placed in the space formed between adjacent blocks and into the clearance or space which is allowed between the upstanding ribs or plates of the carrying members and intermediate members, covering such members so as to protect them and bind them with the juxtaposed portion of the glass blocks. I may fill the space between the light pervious blocks and between their faces and the web or upstanding plates of the grille members, in part with insulating oakum, or other material, and in any case the upper portion of the space has expansion and contraction material which binds with the surface of the glass or like material and forms a seal at the top between adjacent glass members, and which clings to such surfaces and forms a seal flush with the upper surface of the glass members, and down into the space sufficiently to provide permanent watertightness, and water-shedding of the surface of the roof light. The sealing or binding material may also extend down from the top sufficiently to cling to the upright members of the grille, and, in any event, the filling of the interstices between the light pervious members encloses and protects the grille members. The weight of the block or glass pervious members is supported on the lower shelf members of the carrying members and intermediate members, as more particularly shown in one form of hollow insulating glass block combination, in Fig. VIII.

The grille is made up by assembling the several members, as described, the several members each having been made complete in itself. Each of the various members may thus be fabricated, and then if not bronze, aluminum or other like material, they are given a protective finish, as by galvanizing, so that then the cut ends, notches, or other machined surfaces, are completely and permanently protected.

The border members 1 may be made of any lengths and sections so that they may be placed end-to-end to provide for the border of the grille on any length of roof opening. The carrying members or bars likewise may be made of standard sizes and carried in stock, to accommodate predetermined sizes of glass blocks for the roof light, and of standard widths of roof opening, to provide for the proper support of the roof light, each size being for a predetermined number of light blocks. The intermediate members can be made in quantity and stocked, of the necessary size or sizes for the desired size of light pervious blocks to be used in the finished roof light. The positioning clips on the carrying members may be as shown in Figs. V and VI, or varied, and are formed in dimensions to fit under the base of the carrying members and extend on either side, being so formed that when positioned they extend at right angles to and beyond the base of the carrying member, in order to accurately accommodate the end of the intermediate members when they are placed in position. These members, after being positioned on the carrying members, are secured as by welding, or otherwise, to provide a firm supporting attachment to the carrying bars. In the form shown in Fig. VI, the upturned edges of the clip register with the edges of the base of the carrying member, to more positively position the clip for its permanent position on the base of the carrying bar.

The border members 1 comprise a base 1ª and notches 1ᵇ, in the web or rib 1ᶜ. These notches are spaced so as to definitely position the ends of the carrying bars 2, when assembled. One end of the border members may be cut square, and the other end may be formed to splice with the abutting end of the second section of a border member, such splicing being of any preferred form to assure the alignment of the border members to the full length of the edge of the roof opening.

The carrying members 2 have their web or rib 2a extending at each end beyond the base 2b, so that the projecting web, being the principal load-carrying portion of the carrying bar, rests in the notch 1b and on the base 1a of the border member. At predetermined intervals on the bottom of the base of the carrying member, clips, as shown in Figs. V and VI, are secured as by welding. The carrying member base is so formed that the end abuts the base 1a of the border member, as shown in Fig. VII, so that the top surface of both bases are on the same level for the support of the glass blocks placed in the series of apertures at each side of the roof opening. 2a' shows a notched rib end of the carrying member to hold it in fixed position to the border member 1.

The intermediate members 3 have a base 3a secured to a web or rib 3b, which extends at each end slightly beyond the base so that the same may rest upon the base or flange of the carrying member, with the upper surface of the base of the intermediate member flush with the upper surface of the base of the carrying member, in order to form a uniform support for the glass block inserted in the apertures formed by the grille when all of the members are assembled together.

All of the different members or elements of the grille are thus each made complete as to their individual fabrication, and can be packed and shipped in compact form, and without danger of injury in transportation. Furthermore, they can be handled and transported to the roof, or other place of final and permanent installation, in convenient quantities, permitting great saving in the handling of the material for the finished grille and complete roof light. This is in contrast to methods heretofore practiced, such as the fabrication of a complete assembled grille, which thereby involves difficulties in the matter of weight and chance of damage during transportation, inconvenience and consequently relatively much greater expense in transporting to location for final use, that is permanent installation. Furthermore, such completely fabricated grilles mean that the finished grid or grille cannot be made up and kept in stock except for definite sizes and without chance of variation to accommodate it to different roof openings. The exception is the construction shown in my copending application Ser. No. 178,651, filed December 8, 1937, which involves grilles or grids adapted to accommodate different lengths of roof openings with complete grid sections of convenient sizes.

In the present application my invention involves the various members so formed and arranged whereby, when at their final location, each of the members is placed in position without any labor or workmanship beyond the mere handling and placing in position. Upon the positioning of the border members, the transverse or load-carrying members, and thereafter the intermediate members, are successively let into position, or dropped into position, and thereupon form a complete rigid grille ready for the implacement of the light pervious blocks. The inter-engaging parts of the successive members may be formed for a tight or pressed fit. The load-carrying members have their webs supported by the border members, and throughout their length the abutting webs of the intermediate members laterally support the webs of the load-carrying members, thereby forming a fixed assembly of a complete supporting structure.

Upon the dropping or placing in position of the light pervious blocks, or inserting of the material between the glass blocks, provides for filling the interstices and sealing them at the top or throughout, thus binding the glass members and members of the grille into a rigid and permanent glass roof, accommodating any slight expansion or contraction. This assures a watertight roof light with the weather side water-shedding, and with a permanent flush surface of glass and sealing material exposed to the weather, and with the load-carrying webs of the grille completely covered and protected.

In this construction the transverse or load-carrying members may be made of a web of ample depth, and still of less height than the depth or thickness of insulated hollow blocks. The combined strength of the webs and bottom plates or bases provide the necessary strength, and in the case of larger than normal span of roof opening thicker or deeper glass blocks may be used, permitting a greater depth of the web of the transverse members, so that in all, variations of size and section of members afford the flexibility in the making of the individual members, for what may be called universal use of the invention to accommodate practically any size of roof opening, with economy in manufacture, transportation and installation.

Variations may be made in the size and section, also in the interconnecting parts between members. Also, I may add devices or elements for temporary holding of different elements in position during assembly, or parts for more permanent interlocking. These and various modifications may be made without departing from my invention in what I term a knock-down grille for roof lights, and in the production of a finished glass roof with insulating hollow light pervious blocks arranged and combined to form a rigid and permanent installation. What I claim and desire to secure by Letters Patent is:

1. A roof light or the like having a grille positioning and supporting hollow glass blocks, comprising separately made sets of finished grille members, each constructed to be placed successively on the previously emplaced set at substantially right angles thereto, interengaging means between the members of each set to hold them in interlocking position by their weight, each member having bottom shelf supports and upstanding rigidly associated shield webs to carry and position said glass blocks, and sealing material covering said webs between blocks and having a top surface of the roof light flush with the top of the blocks.

2. A knock-down grille for roof lights and the like for positioning and support of hollow light pervious blocks, comprising border members for a roof opening, transverse load carrying members with bottom shelf-supports for said blocks and upstanding web shields extending upward between the rims of adjacent blocks, cross members adapted for emplacement between adjacent load carrying members with interengaging positioning means therewith and having each an upstanding web rib to position the blocks and extend upward toward the top surface of the blocks, whereby sealing means flush with block top surfaces holds the blocks and covers grille member webs.

LOGAN WILLARD MULFORD.